(12) United States Patent
Kotani et al.

(10) Patent No.: US 9,046,034 B2
(45) Date of Patent: Jun. 2, 2015

(54) ENGINE DRIVEN POWER GENERATION APPARATUS

(75) Inventors: Takafumi Kotani, Wako (JP); Masanori Takeishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1223 days.

(21) Appl. No.: 12/606,708

(22) Filed: Oct. 27, 2009

(65) Prior Publication Data

US 2010/0244458 A1 Sep. 30, 2010

(30) Foreign Application Priority Data

Oct. 29, 2008 (JP) ................................ 2008-278604

(51) Int. Cl.
*F01P 5/08* (2006.01)
*F02B 63/04* (2006.01)
*H02K 9/04* (2006.01)
*F01P 1/00* (2006.01)

(52) U.S. Cl.
CPC . *F02B 63/04* (2013.01); *F01P 5/08* (2013.01); *F01P 2001/005* (2013.01); *H02K 9/04* (2013.01); *Y02E 20/14* (2013.01)

(58) Field of Classification Search
CPC ........... F02B 2063/04; F02B 2063/044; F02B 63/04; F02B 63/044; F01P 5/08; H02K 9/00; H02K 9/02; H02K 9/04
USPC ............. 310/58; 123/41.7, 41.63, 2, 3, 41.64; 181/204, 224, 225; 290/1 R
See application file for complete search history.

(56) References Cited

U.S. PATENT DOCUMENTS

| 3,566,142 | A | | 2/1971 | Dabell |
| 4,516,657 | A | | 5/1985 | Allard |
| 5,014,660 | A | * | 5/1991 | Westerbeke, Jr. ......... 123/198 E |
| 5,121,715 | A | * | 6/1992 | Nogami et al. ............. 123/41.7 |
| 5,890,460 | A | | 4/1999 | Ball et al. |
| 5,899,174 | A | * | 5/1999 | Anderson et al. ................. 123/2 |
| 5,908,011 | A | * | 6/1999 | Stauffer et al. ................... 123/2 |

(Continued)

FOREIGN PATENT DOCUMENTS

| DE | 2613613 A1 | | 10/1977 |
| JP | 56-66021 | * | 6/1981 |

(Continued)

OTHER PUBLICATIONS

European Search Report dated Jan. 8, 2010, issued in corresponding European Patent Application No. 09174009.2.

(Continued)

*Primary Examiner* — Lindsay Low
*Assistant Examiner* — Jacob Amick
(74) *Attorney, Agent, or Firm* — Westerman, Hattori, Daniels & Adrian, LLP (57) ABSTRACT

In an engine-driven power generation apparatus, where an engine and a power generator driven by the engine are accommodated in a hermetically sealed housing and where an external air take-in pipe takes air into the housing, an air discharge pipe discharges the taken-in air to outside of the housing and an engine exhaust pipe discharges exhaust gas to outside of the housing, an ejector chamber is provided outside of the housing for causing the air, flowing in the air discharge pipe, to be compulsorily sucked to outside of the housing through a sucking action of the exhaust gas flowing in the engine exhaust pipe.

2 Claims, 6 Drawing Sheets

(56) References Cited

U.S. PATENT DOCUMENTS

| | | | |
|---|---|---|---|
| 6,230,667 B1 * | 5/2001 | Stauffer et al. | 123/2 |
| 6,784,574 B2 * | 8/2004 | Turner et al. | 310/58 |
| 7,207,172 B2 * | 4/2007 | Willix et al. | 60/317 |
| 8,186,314 B2 * | 5/2012 | Brunelli et al. | 123/2 |
| 2002/0121818 A1 | 9/2002 | Turner et al. | |

FOREIGN PATENT DOCUMENTS

| | | |
|---|---|---|
| JP | 56-66021 U | 6/1981 |
| JP | 01-125818 U | 8/1989 |
| JP | 04-054226 A | 2/1992 |
| JP | 11-200951 A | 7/1999 |
| JP | 2006-524163 A | 10/2006 |
| WO | 2004/091958 A1 | 10/2004 |

OTHER PUBLICATIONS

Notification of Reasons for Refusal dated Jan. 24, 2012, issued in corresponding Japanese Patent Application No. 2008-278604.

Japanese Office Action dated Apr. 17, 2012, issued in corresponding Japanese Patent Application No. 2008-278604, (4 pages).

* cited by examiner

ENGINE DRIVEN POWER GENERATION APPARATUS

FIELD OF THE INVENTION

The present invention relates to an engine-driven power generation apparatus for application, for example, to cogeneration.

BACKGROUND OF THE INVENTION

Among the conventionally-known types of power generators for application to cogeneration is the engine-driven type, and one example of such an engine-driven type power generator is disclosed in Japanese Patent Application Laid-open Publication No. HEI-11-200951A.

Figure 6:
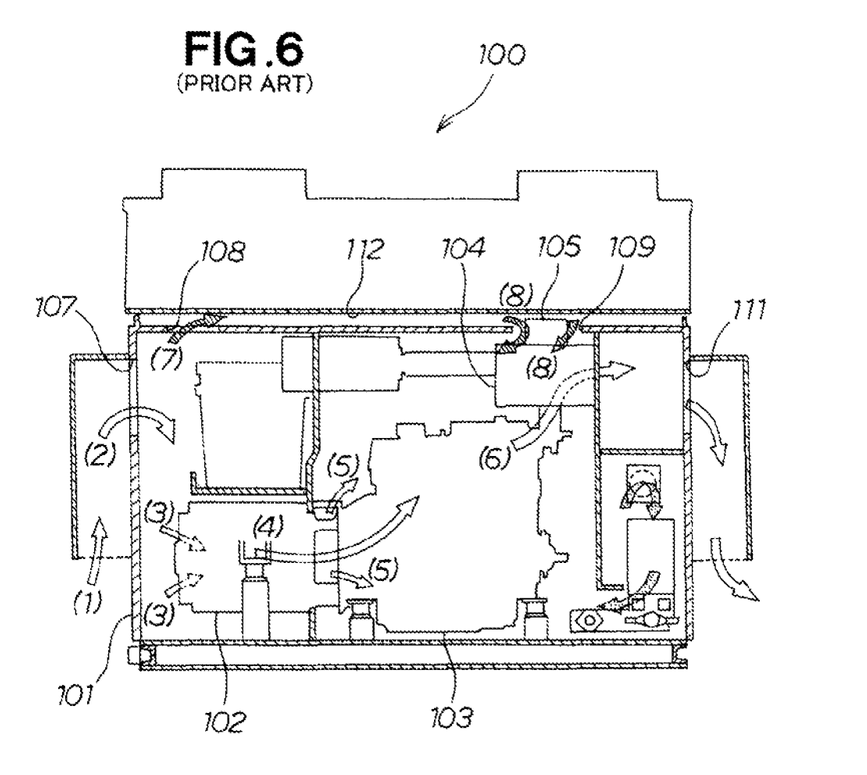
FIG. 6 is a view explanatory of a fundamental construction of a conventionally-known engine-driven power generation apparatus.

FIG. 6 hereof is a view explanatory of a fundamental construction of the engine-driven power generation apparatus for cogeneration disclosed in the HEI-11-200951A publication. This engine-driven power generation apparatus 100 includes, within a housing 101, a power generator 102, an engine 103 connected with the power generator 102 to drive the power generator 102, a ventilation fan 104 disposed above the engine 103, and a motor 105 connected with the ventilation fan 104 to drive the fan 104.

In the housing 101 are formed: an external air take-in hole 107 for taking in external air into the housing 101 for cooling the engine 103 and motor 105; a motor cooling air take-in hole 108 for taking in and directing part of the external air, taken in through the external air take-in hole 107, to and along the motor 105 to cool the motor 105; a motor cooling air discharge hole 109 for discharging the air taken in through the motor cooling air take-in hole 108 after cooling the motor 105; and an air discharge hole 111 for not only discharging the air discharged through the motor cooling air discharge hole 109 to outside of the housing 101 but also discharging the air, taken in through the external air take-in hole 107 and passed along an outer peripheral portion of the engine 103, to outside of the housing 101.

In the engine-driven power generation apparatus 100, the power generator 102 is driven by the engine 103 to generate electric power. The power generator 102 and engine 103 would produce heat during the power generation, and thus, there arises a need to cool the power generator 102 and engine 103 by discharging the heat to outside of the housing 101.

To cool the power generator 102 and engine 103 in the engine-driven power generation apparatus 100, the ventilation fan 104 is driven. By the ventilation fan 104 being driven, a negative pressure is produced within the housing 101, so that external air is taken, through the external air take-in hole 107, into the housing 101 as indicated by arrows (1) and (2) in FIG. 6. Most part of the taken-in air passes along the power generator 102 and engine 103 as indicated by arrows (3) and (5) and is then discharged, via the ventilation fan 104, to outside of the housing 101 through the air discharge hole 111.

In the aforementioned manner, a convection flow of air is produced within the housing 101, so that heat produced from the power generator 102 and engine 103 is discharged to outside of the housing 101. Further, the motor 105, which is a drive source for the ventilation fan 104, too would produce heat as it drives the ventilation fan 104. Cooling of the motor 105 too is effected by the external air taken through the external air take-in hole 107. Namely, part of the external air taken through the external air take-in hole 107 is directed through the motor cooling air take-in hole 108 to pass along a cooling air passageway 112 and then discharged through the motor cooling air discharge hole 109 together with the head produced from the motor 105.

However, the power generation apparatus 100 disclosed in the No. HEI-11-200951 publication requires a great number of component parts and hence high manufacturing cost, because it calls for the ventilation fan 104 for producing the negative pressure, the motor 105 for driving the ventilation fan 104 and the cooling air passageway 112 for passage therealong the air for cooling the motor 105.

SUMMARY OF THE INVENTION

In view of the foregoing prior art problems, it is an object of the present invention to provide an improved engine-driven power generation apparatus which can be manufactured with a reduced number of component parts and hence at reduced cost.

In order to accomplish the above-mentioned object, the present invention provides an improved engine-driven power generation apparatus, which comprises: an engine and a power generator accommodated in a hermetically sealed housing, the power generator being driven by the engine to generate electric power; an external air take-in pipe for taking air into the hermetically sealed housing from outside the housing, the power generator being cooled by the taken-in air, a part of the taken-in air, having cooled the power generator, being used as combustion air for the engine; an air discharge pipe having an upstream end portion located or inserted in the housing for discharging a remaining part of the taken-in air, having cooled the power generator, to outside of the housing; an engine exhaust pipe for discharging exhaust gas of the engine from the engine to outside of the housing; and an ejector chamber provided outside of the hermetically sealed housing for causing the air, flowing in the air discharge pipe, to be compulsorily sucked to the outside of the hermetically sealed housing through a sucking action of the engine exhaust gas flowing in the engine exhaust pipe in a direction from the engine toward outside of the housing.

The engine-driven power generation apparatus of the present invention, which is provided with the ejector chamber for causing the air, flowing in the air discharge pipe, to be compulsorily sucked to the outside of the hermetically sealed housing together with heat within the housing through the sucking action of the engine exhaust gas flowing in the engine exhaust pipe, requires no separate motor and ventilation fan for discharging heat from within the housing. As a result, the engine-driven power generation apparatus of the present invention can be manufactured with a reduced number of component parts and hence at reduced manufacturing cost.

Preferably, a downstream end portion of the air discharge pipe is inserted in the engine exhaust pipe, and the ejector chamber comprises a dual pipe structure including: an inner pipe section which is defined by the downstream end portion of the air discharge pipe and into which the air flows from within the housing through the upstream end portion of the air discharge pipe; and an outer pipe section which is defined by a portion of the engine exhaust pipe having the downstream end portion of the air discharge pipe inserted therein (i.e., surrounding the downstream end portion of the air discharge pipe) and into which the exhaust gas flows from the engine through an upstream end portion of the engine exhaust pipe. In this case, a straight pipe can be advantageously used as the inner pipe section. The inner pipe section in the form of such a straight pipe can significantly reduce an air flow resistance (i.e., resistance in an air flow path defined by the straight pipe), and thus reduce a loss due to the air flow resistance, within the inner pipe section as compared to the inner pipe section in the form of a curved pipe. The present invention permits efficient discharge of heat from within the hermetically sealed housing.

In an alternative, a downstream end portion of the engine exhaust pipe is inserted in the air discharge pipe, and the ejector chamber comprises a dual pipe structure: including: an inner pipe section which is defined by the downstream end portion of the engine exhaust pipe and into which the exhaust gas flows from the engine through an upstream end portion of the engine exhaust pipe; and an outer pipe section which is defined by a portion of the air discharge pipe having the downstream end portion of the exhaust gas pipe inserted therein and into which the air flows from within the housing through the upstream end portion of the air discharge pipe. Because the engine exhaust gas has a high temperature, some countermeasure, such as providing a heat insulating material around the engine exhaust pipe, is normally taken to cope with the heat of the engine exhaust gas. With the distal end portion of the engine exhaust pipe provided as the inner pipe section and surrounded by the outer pipe section of the air discharge pipe, the present invention can simplify the countermeasure against the heat of the engine exhaust gas.

Preferably, the downstream end portion of the engine exhaust pipe, inserted in the air discharge pipe, has a narrowed distal end. With the narrowed distal end of the engine exhaust pipe, the present invention can even more efficiently cause the air, flowing in the air discharge pipe, to be compulsorily sucked to the outside of the hermetically sealed housing, together with heat within the housing, through the sucking action of the engine exhaust gas flowing in the engine exhaust pipe.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
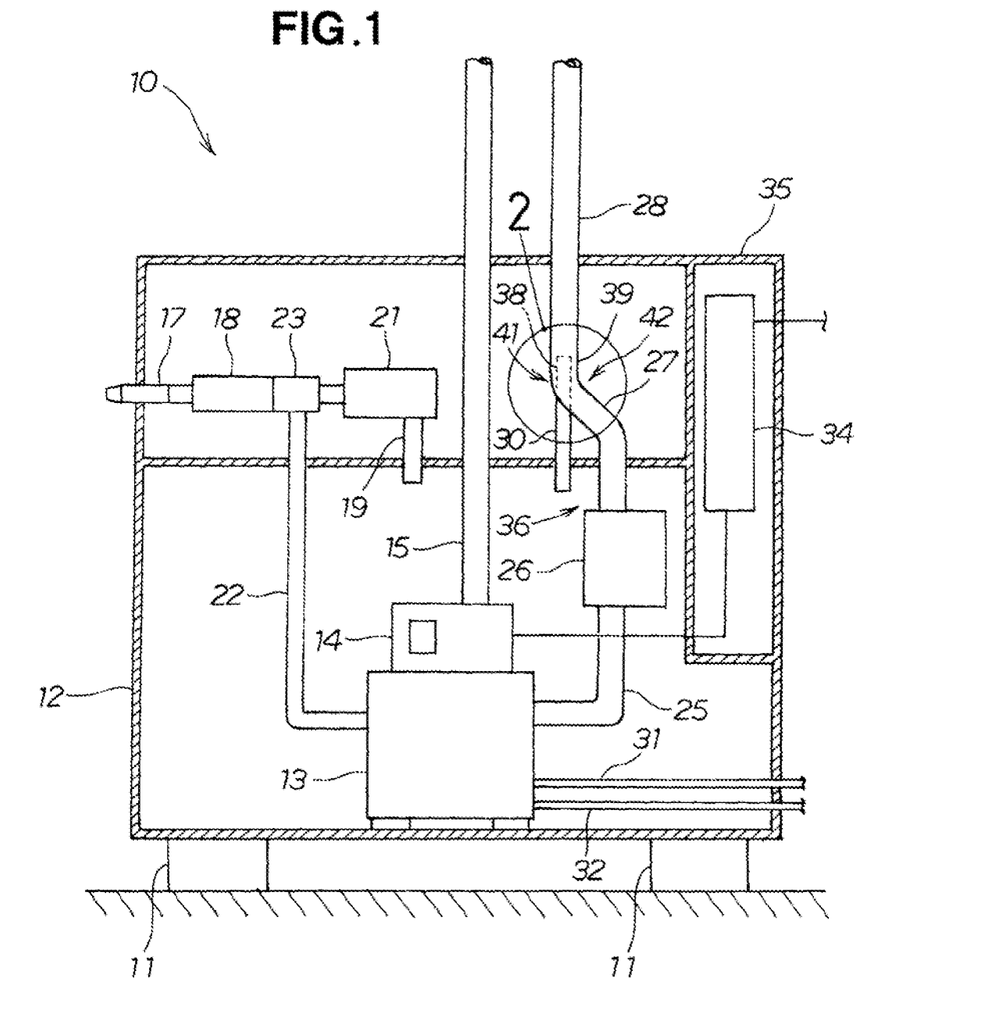
FIG. 1 is a view explanatory of a first embodiment of an engine-driven power generation of the present invention.

Reference is now made to FIG. 1 illustrating a first embodiment of an engine-driven power generation apparatus 10 of the present invention. In the following, the engine-driven power generation apparatus 10 of the present invention will be described as applied to home-use cogeneration.

The engine-driven power generation apparatus 10 includes: a hermetically sealed housing 12 supported on support bases 11; an engine 13 provided within the hermetically sealed housing 12 and driven by fuel in the form of gas, a power generator 14 disposed over the engine 13 and driven by the engine 13, and an external air taken-in pipe 15 connected with the power generator 14 for taking in external air from outside of the hermetically sealed housing 12 to cool the power generator 14. The engine-driven power generation apparatus 10 also includes: a vaporizing chamber 18 for vaporizing gas supplied through a gas supply pipe 17 so as to feed the gas to the engine 13; an air cleaner 21 for purifying the air supplied from the interior of the housing 12 through an air supply pipe 19; and a mixing chamber 23 for mixing the air, purified by the air cleaner 21, with the gas, vaporized by the vaporizing chamber 18, to feed the resultant air-gas mixture to the engine 13 through a fuel supply pipe 22. The engine-driven power generation apparatus 10 further includes: a first discharge pipe 25 of an L shape for discharging exhaust gas produced from the engine 13; a second discharge pipe 28 connected to the first discharge pipe 25 via a muffler 26 and having a curved section 27; an air discharge pipe 30 having one end (upstream end) portion located within the housing 12 and another end (downstream end) portion inserted in the second discharge pipe 28 for discharging air with heat from within the housing 12; a cooling water take-in pipe 31 for taking cooling water into the engine 13; a cooling water supply pipe 32 disposed below the cooling water take-in pipe 31 to supply the cooling water, warmed or heated by the engine 13, as a heat source; an inverter 34 connected with the power generator 14 to convert a direct current to an alternating current; and a cover 35 disposed over the hermetically sealed housing 12 to cover the inverter 34, air cleaner 21, mixing chamber 23 and vaporizing chamber 18.

The exhaust gas of the engine 13 is discharged to outside of the hermetically sealed housing 12 through the first discharge pipe 25, muffler 26 and second discharge pipe 28. Namely, the first discharge pipe 25, muffler 26 and second discharge pipe 28 together constitute an engine exhaust pipe 36. Heat of the exhaust gas discharged through the engine exhaust pipe 36 can be used as the heat source for warming or heating water.

Namely, in the engine-driven power generation apparatus 10 of the invention, the gas supplied through the gas supply pipe 17 and vaporized in the vaporizing chamber 18 and the air purified by the air cleaner 21 is mixed together in the mixing chamber 23 to create an air-gas mixture. The air-gas mixture is supplied to the engine 13 through the fuel supply pipe 22, the engine 13 is driven by the supplied air-gas mixture, and then the power generator 14 is driven by the engine 13 to generate electric power. The thus-generated electric power is converted via the inverter 34 from a direct current to an alternating current that is supplied into a house.

External air is taken into the hermetically sealed housing 12 through the external air taken-in pipe 15 and power generator 14, during which time the power generator 14 is cooled by the taken-in external air. Part of the taken-in external air, having cooled the power generator 14, is used as combustion air for the engine 13; that is, the part of the taken-in external air is sucked into the air supply pipe 19 and then sent to the engine 13 through the air cleaner 21 etc. The remaining part of the taken-in external air, having cooled the power generator 14, fills the housing 12 and is discharged out of the hermetically sealed housing 12 through the air discharge pipe 30.

Figure 2:
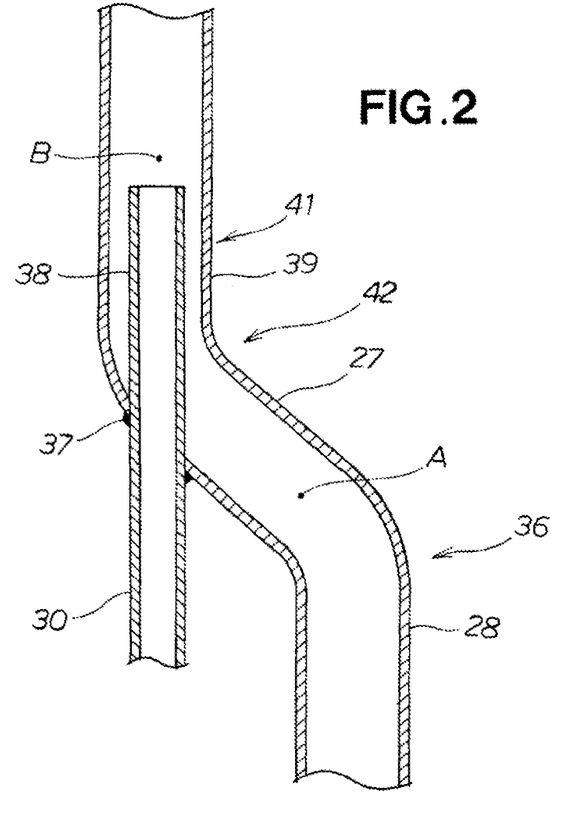
FIG. 2 is an enlarged view of a section encircled at 2 in FIG. 1.

FIG. 2 is an enlarged view of a section encircled at 2 in FIG. 1. The engine exhaust pipe 36 has the curved section 27 curved (leftward in the FIG. 10 to connect with the air discharge pipe 30 in fluid communication with the air discharge pipe 30. The air discharge pipe 30 has the one end (i.e., upstream end) portion inserted in the hermetically sealed housing 12 and the other end (i.e., downstream distal end) portion inserted in the second discharge pipe 28 and welded with the second discharge pipe 28 at a connection section 37. As shown in FIG. 2, the downstream end portion of the air discharge pipe 30 is inserted into the engine exhaust pipe 36 through a peripheral wall of the engine exhaust pipe 36 at the curved section 27 of the engine exhaust pipe 36.

The other end (downstream end) portion of the air discharge pipe 30 defines an inner pipe section 38 extending from the distal (upper in the figure) end to the connection section 37 of the air discharge pipe 30 and disposed within the engine exhaust pipe 36. Further, of the engine exhaust pipe 36, a portion in which the air discharge pipe 30 is inserted defines an outer pipe section 39 surrounding the inner pipe section 38. Namely, the inner pipe section 38 and the outer pipe section 39 together constitute a dual pipe structure 41.

Further, an ejector chamber 42 for compulsorily sucking in the air, which flows in the air discharge pipe 30, to the outside of the housing 12 (upwardly in the illustrated example) is provided to extend from a point A of the curved section 27 where the air discharge pipe 30 is not located up to a point B located beyond the distal end of the air discharge pipe 30. Namely, the ejector chamber 42 comprises the dual pipe structure 41 including: the inner pipe section 38 which is defined by the other end (downstream end) portion of the air discharge pipe 30 inserted in the second discharge pipe 28 and into which the air flows from within the housing 12 upwardly through the one end (upstream end) portion (inserted in the hermetically sealed housing 12) of the air discharge pipe 30; and the outer pipe section 39 which is defined by the portion of the engine exhaust pipe 36 having the one end (upstream end) portion of the air discharge pipe 30 inserted therein and into which the exhaust gas flows upwardly from the engine 13 through an upstream end portion of the engine exhaust pipe 36.

To construct the dual pipe structure 41, the inner pipe section 38 only need to be inserted in the outer pipe section 39, in which case a straight pipe can be advantageously used as the inner pipe section 38. The inner pipe section 38 in the form of such a straight pipe can significantly reduce an air flow resistance (i.e., resistance in an air flow path defined by the straight pipe), and thus reduce a loss due to the air flow resistance, within the inner pipe section 38 as compared to the inner pipe section 38 in the form of a curved pipe; thus, it permits efficient discharge of heat from within the hermetically sealed housing 12.

Figure 3A:
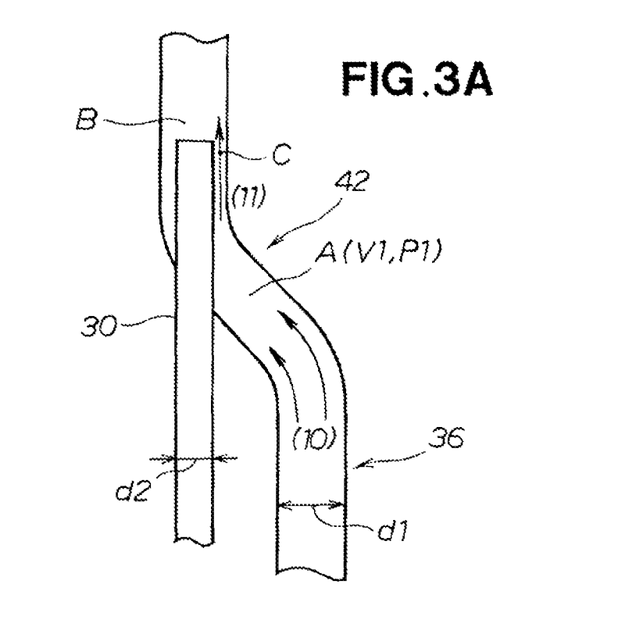
FIGS. 3A and 3B are views explanatory of behavior of the first embodiment of the engine-driven power generation apparatus.
Figure 3B:
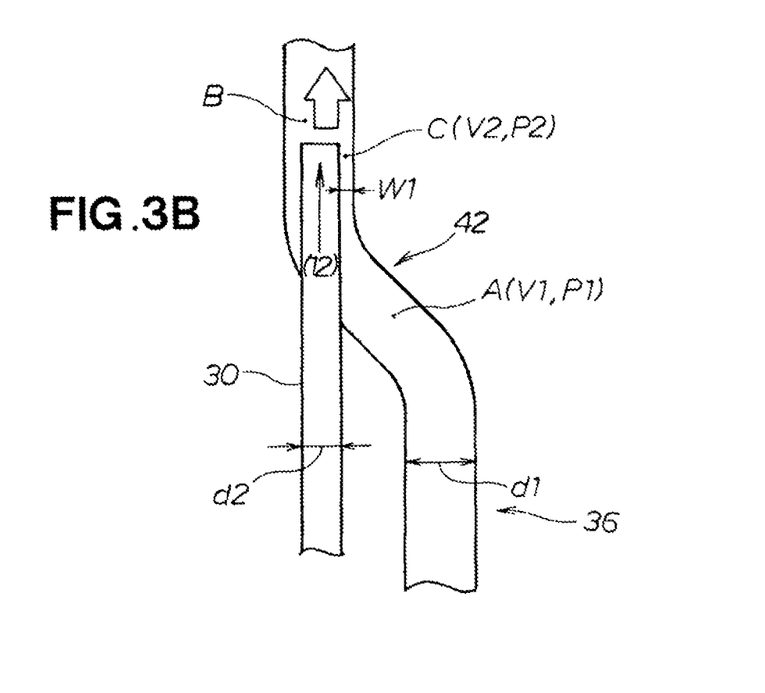

The following describe behavior of the first embodiment of the engine-driven power generation apparatus 10 constructed in the above-described manner, with reference to FIGS. 3A and 3B. As shown in FIG. 3A, exhaust gas is produced as the engine 13 runs, and the produced exhausted gas flows upwardly in the engine exhaust pipe 36 as indicated by upward arrows (10) and then passes a point C immediately adjacent to the outer periphery of the distal end of the air discharge pipe 30 as indicated by an upward arrow (11).

In FIG. 3B, a flow velocity at which the exhaust gas passes the point A that is an entrance to the ejector chamber 42 is indicated by V1, and a flow velocity at which the exhaust gas passes the point C immediately adjacent to the outer periphery of the distal end of the air discharge pipe 30 is indicated by V2. The flow velocity V2 is higher than V1 (i.e., V1<V2) because the former is a velocity at which the exhaust gas flows through a narrow flow path portion of the engine exhaust pipe 36 that is narrower by an outer diameter d2 of the air discharge pipe 30 than a flow path portion of the engine exhaust pipe 36 having a greater inner diameter d1.

Relationship among the flow velocity V1 of the exhaust gas at the point A, a pressure P1 of the exhaust gas at the point A, the flow velocity V2 of the exhaust gas at the point C and a pressure P2 of the exhaust gas at the point C can be expressed by the following mathematical expression:

$$P1/\rho + V1^2/2g = P2/\rho + V2^2/2g,$$

where $\rho$ represents a density and g represents a gravity force. This mathematical expression can be transformed to $$(P1-P2)/\rho = \tfrac{1}{2}g \cdot (V2^2 - V1^2)$$

Because the condition "V1<V2", rather than "0>V1", is set in this case as noted above, relationship of "0<($V2^2-V1^2$)" is established; therefore, 0<(P1−P2), and thus, P1>P2. Namely, it follows that the pressure P1 of the exhaust gas at the point A (i.e., in the portion of the of the exhaust gas pipe 36 where the air discharge pipe 30 is not located) is higher than the pressure P2 of the exhaust gas at the point C (i.e., in the portion of the of the exhaust gas pipe 36 where the air discharge pipe 30 is located).

Because of such a difference between the pressure P1 of the exhaust gas at the point A and the pressure P2 of the exhaust gas at the point C, a force pulling the air upwardly, i.e. to the outside of the hermetically sealed housing 12, from within the air discharge pipe 30 is produced in the ejector chamber 42 as indicated by a white upward arrow, so that the air flowing in the air discharge pipe 30 is compulsorily sucked upward (to the outside of the housing 12) by the pulling force.

The above-mentioned force compulsorily sucking the air from within the air discharge pipe 30 becomes greater as the difference between the inner diameter d1 of the engine exhaust pipe 36 and the outer diameter d2 of the air discharge pipe 30 decreases. Namely, the force compulsorily sucking the air from within the air discharge pipe 30 becomes greater as a width or distance W1 from the outer peripheral surface of the air discharge pipe 30 to the inner peripheral surface of the engine exhaust pipe 36 decreases.

More specifically, the air can be sucked upwardly most efficiently in a case where the inner diameter d1 of the engine exhaust pipe 36 is set at 33 mm, the outer diameter d2 of the air discharge pipe 30 is set at 27 mm and thus the distance W1 from the outer peripheral surface of the air discharge pipe 30 to the inner peripheral surface of the engine exhaust pipe 36 is set at 3 mm.

Further, water droplets are produced on the outer peripheral surface of the air discharge pipe 30 because of a difference in temperature between the air flowing in the air discharge pipe 30 and the engine exhaust gas flowing in the engine exhaust pipe 36. Such water droplets may rather create an opposite effect of becoming a considerable resistance to the flow of the engine exhaust gas and thus reducing the force compulsorily sucking the air from within the air discharge pipe 30, if the distance W1 is set at smaller than 3 mm.

However, as the distance W1 from the outer peripheral surface of the air discharge pipe 30 to the inner peripheral surface of the engine exhaust pipe 36 increases beyond 3 mm, the force compulsorily sucking the air from within the air discharge pipe 30 becomes smaller, so that the efficiency with which the air is sucked from within the air discharge pipe 30 would decrease.

Namely, in the above-described first embodiment of the engine-driven power generation apparatus, the ejector chamber 42 is provided outside the hermetically sealed housing 12 in such a manner that the air flowing in the air discharge pipe 30 can be compulsorily sucked through the sucking action (based on the difference between the pressure P1 of the exhaust gas at the point A and the pressure P2 of the exhaust gas at the point C) of the engine exhaust gas flowing in the engine exhaust pipe 36. Further, the heat within the hermetically sealed housing 12 can also be compulsorily sucked through the sucking action of the engine exhaust gas flowing in the engine exhaust pipe 36. Because of the construction for compulsorily sucking the heat within the hermetically sealed housing 12 through the above-mentioned sucking action of the engine exhaust gas flowing in the engine exhaust pipe 36, the first embodiment of the engine-driven power generation apparatus 10 can be manufactured with a reduced number of component parts and hence at reduced manufacturing cost.

Figure 4:
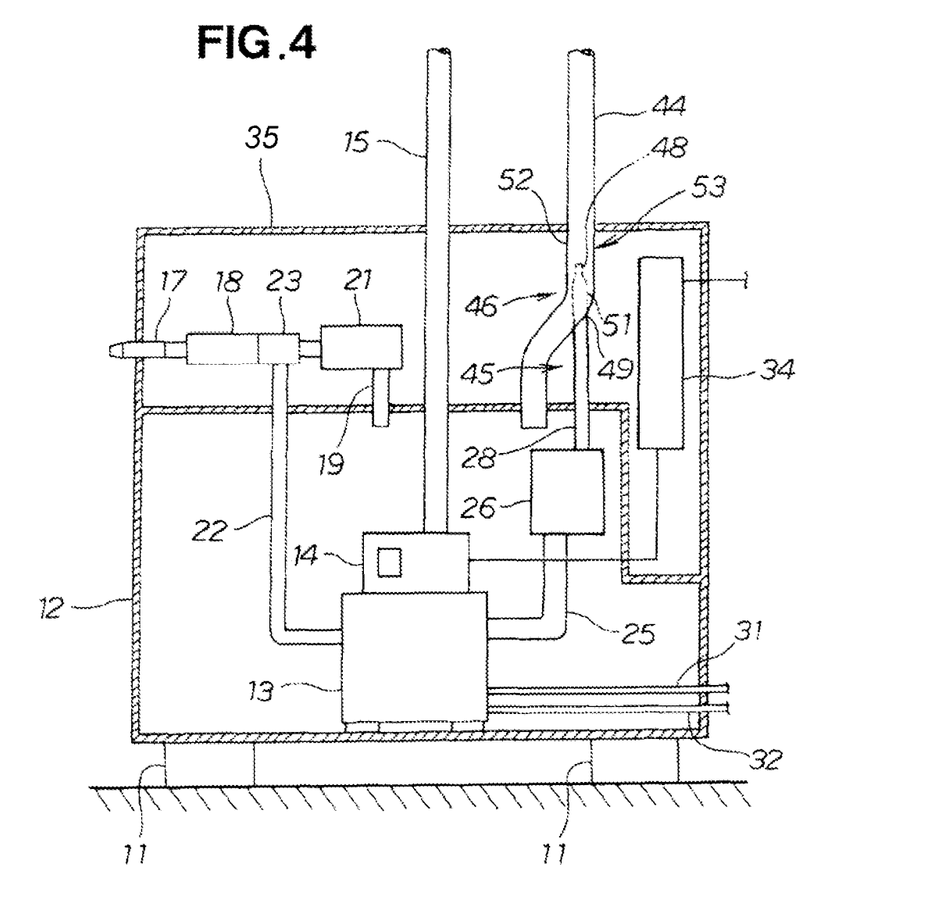
FIG. 4 is a view explanatory of a second embodiment of the engine-driven power generation apparatus of the present invention.

FIG. 4 is a view explanatory of a second embodiment of the engine-driven power generation apparatus 10 of the present invention. In FIG. 4, elements similar in function or operation to those in FIG. 1 are indicated by the same reference numerals as in FIG. 1 and will not be described here to avoid unnecessary duplication. In the second embodiment, it is an air discharge pipe 44 (corresponding to the air discharge pipe 30 in the first embodiment) that is curved (rightward in the figure) to connect with an engine exhaust pipe 45 (corresponding to the engine exhaust pipe 36 in the first embodiment) in fluid communication with the engine exhaust pipe 45 and that has one end (upstream end) portion inserted within the housing 12. The engine exhaust pipe 45 has a distal end (or downstream end) portion inserted in the air discharge pipe 44 so as to provide an ejector chamber 46 (corresponding to the ejector chamber 42 in the first embodiment).

In the second embodiment, a distal end (or downstream end) portion of the engine exhaust pipe 45, inserted in the air discharge pipe 44, defines an inner pipe section 51 extending from a narrowed distal end 48 to a connection section 49. Of the air discharge pipe 44, a portion in which the distal (downstream) end portion the engine exhaust pipe 45 is located defines an outer pipe section 52 surrounding the inner pipe section 51. Namely, the inner pipe section 51 and the outer pipe section 52 together constitute a dual pipe structure 53.

The ejector chamber 46 comprises the dual pipe structure 53 including: the inner pipe section 51 which is defined by the distal or downstream end portion of the engine exhaust pipe 45 and into which the exhaust gas flows upwardly from the engine 13 through an upstream end portion of the engine exhaust pipe 45; and the outer pipe section 52 which is defined by the portion of the air discharge pipe 44 having the distal end (downstream end) portion of the engine exhaust pipe 45 inserted therein and into which the air flows upwardly from the upstream end portion (within the hermetically sealed housing 12) of the air discharge pipe 44 and the inner pipe section 51 into which the exhaust gas flows upwardly from an upstream end portion of the engine exhaust pipe 45. Because the engine exhaust gas has a high temperature, some countermeasure, such as providing a heat insulating material around the engine exhaust pipe 45, is normally taken to cope with the heat of the engine exhaust gas. With the distal end portion of the engine exhaust pipe 45 provided as the inner pipe section 51 and surrounded by the outer pipe section 52 of the air discharge pipe 44 as noted above, the second embodiment can simplify the countermeasure against the heat of the engine exhaust gas.

Figure 5A:
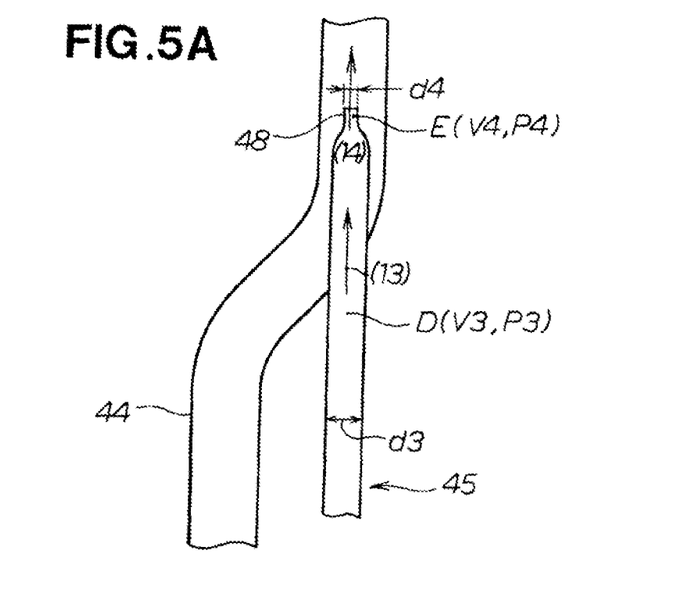
FIGS. 5A and 5B are views explanatory of behavior of the second embodiment of the engine-driven power generation apparatus.
Figure 5B:
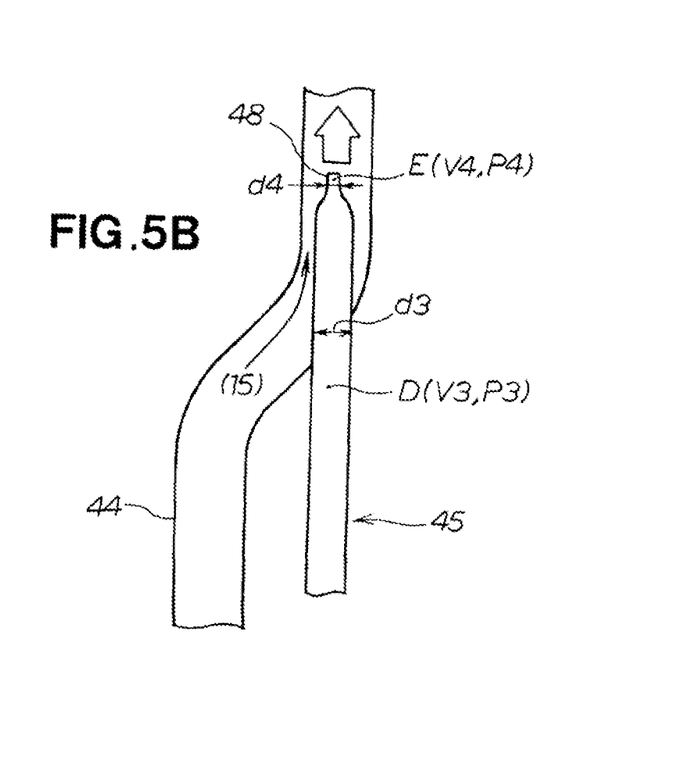

The following describe behavior of the second embodiment of engine-driven power generation apparatus 10 constructed in the above-described manner, with reference to FIGS. 5A and 5B. As shown in FIG. 5A, exhaust gas is produced as the engine 13 runs, and the produced exhausted gas flows upwardly in the engine exhaust pipe 45 as indicated by an upward arrow (13) and passes through the narrowed distal end 48 as indicated by an upward arrow (14). As shown in FIGS. 5A and 5B, the downstream end portion of the engine exhaust pipe 45 is inserted into the air discharge pipe 44 through a peripheral wall of the air discharge pipe 44 at the curved section of the air discharge pipe 44.

In FIG. 5B, a flow velocity at which the exhaust gas passes a point D that is an entrance to the ejector chamber 46 is indicated by V3, and a flow velocity at which the exhaust gas passes a point E at the narrowed distal end 48 is indicated by V4. In this case, because an inner diameter d4 of the narrowed distal end 48 is smaller than an inner diameter d3 of the remaining or unnarrowed section (located under the narrowed distal end 48) of the engine exhaust pipe 45, the flow velocity V4 at which the exhaust gas passes the point E in the narrowed distal end 48 is higher than the flow velocity V3 at which the exhaust gas passes the point D (i.e., V3<V4).

Also, a pressure P3 of the engine exhaust gas at the point D (i.e., in a non-narrowed portion of the engine exhaust pipe 45) is higher than a pressure P4 at the point E (in the narrowed end of the engine exhaust pipe 45). Because of such a difference between the pressures P3 and P4, a force pulling the air upward, i.e. to the outside of the hermetically sealed housing 12, is produced by indicated by an upward white arrow (b), so that the second embodiment can even more effectively cause the air, flowing in the air discharge pipe 44, to be compulsorily sucked upward (i.e., to the outside of the housing 12) as indicated by an upward arrow (15). The force compulsorily sucking the air becomes greater as the difference between the inner diameter d4 of the narrowed distal end 48 and the inner diameter d3 of the remaining section (located under the narrowed distal end 48) of the engine exhaust pipe 45 increases.

Whereas the first and second embodiments of the engine-driven power generation apparatus of the invention have been described above as applied to home-use cogeneration, it may be applied to any other purposes than home-use cogeneration as long as there is a need to discharge heat of an engine, produced due to operation of the engine within a hermetically sealed housing, to outside the housing.

The engine-driven power generation apparatus of the present invention is well suited for use as power generation apparatus to be applied to home-use cogeneration.

What is claimed is:

1. An engine-driven power generation apparatus comprising:
    an engine and a power generator accommodated in hermetically sealed housing, the power generator being driven by the engine to generate electric power;
    an external air take-in pipe for taking air into the housing from outside the housing, the power generator being cooled by the air taken in through the external air take-in pipe, a part of the taken-in air, having cooled the power generator, being used as combustion air for the engine;
    air discharge pipe having an upstream end portion inserted in the housing for discharging a remaining part of the taken-in air, having cooled the power generator, to outside of the housing, the air discharge pipe having a portion which is outside of the housing; and
    an engine exhaust pipe for discharging exhaust gas of the engine from the engine to outside of the housing;
    wherein a portion of the air discharge pipe and a portion of the engine exhaust pipe together form an ejector chamber provided outside of the hermetically sealed housing for causing the air, flowing in the air discharge pipe, to be compulsorily sucked to outside of the housing through a sucking action of the exhaust gas flowing in the engine exhaust pipe in a direction from the engine toward outside of the housing, wherein the engine exhaust pipe comprises a single pipe having a constant diameter throughout the length thereof and including a first straight section disposed inside the housing, a second straight section disposed outside the housing, and a curved section located outside the housing and extending continuously between the first straight section and the second straight section, the first straight section and the second straight section being parallel to each other, the curved section of the engine exhaust pipe being curved toward the air discharge pipe and connected with the air discharge pipe in fluid communication with the air discharge pipe, wherein the air discharge pipe is a single straight pipe having a constant diameter throughout the length thereof and has a downstream end portion inserted in the engine exhaust pipe, the straight air discharge pipe being parallel to the first and second straight sections of the engine exhaust pipe, wherein the ejector chamber extends from a point of the curved section of the engine exhaust pipe where the air discharge pipe is not located up to a point located beyond the downstream end portion of the air discharge pipe, wherein the ejector chamber comprises a dual pipe structure including:
  an inner pipe section which is defined by the downstream end portion of the air discharge pipe and into which the air flows from within the housing through the upstream end portion of the air discharge pipe; and
  an outer pipe section which is defined by a portion of the engine exhaust pipe having the downstream end portion of the air discharge pipe inserted therein and into which the exhaust gas flows from the engine through an upstream end portion of the engine exhaust pipe, and wherein the downstream end portion of the air discharge pipe is inserted into the engine exhaust pipe through a peripheral wall of the engine exhaust pipe at the curved section of the engine exhaust pipe.

2. An engine-driven power generation apparatus comprising:
  an engine and a power generator accommodated in a hermetically sealed housing, the power generator being driven by the engine to generate electric power;
  an external air take-in pipe for taking air into the housing from outside the housing, the power generator being cooled by the air taken through the external air take-in pipe, a part of the taken-in air, having cooled the power generator, being used as combustion air for the engine;
  an air discharge pipe having an upstream end portion inserted in the housing for discharging a remaining part of the taken-in air, having cooled the power generator, to outside of the housing, the air discharge pipe having a portion which is outside of the housing; and
  an engine exhaust pipe for discharging exhaust gas of the engine from the engine to outside of the housing;

wherein a portion of the air discharge pipe and a portion of the engine exhaust pipe together form an ejector chamber provided outside of the hermetically sealed housing for causing the air, flowing in the air discharge pipe, to be compulsorily sucked to outside of the housing through a sucking action of the exhaust gas flowing in the engine exhaust pipe in a direction from the engine toward outside of the housing, wherein the air discharge pipe is a single pipe having a constant diameter throughout the length thereof and including a first straight section disposed inside the housing, a second straight section disposed outside the housing, and a curved section located outside the housing and extending continuously between the first straight section and the second straight section, the first straight section and the second straight section being parallel to each other, the curved section of the air discharge pipe being curved toward the engine exhaust pipe and connected with the engine exhaust pipe in fluid communication with the engine exhaust pipe, wherein the engine exhaust pipe comprises a single straight pipe and has a downstream end portion inserted in the air discharge pipe, the downstream end portion of the engine exhaust pipe having a narrowed distal end, wherein the ejector chamber extends from a point of the curved section of the air discharge pipe where the engine exhaust pipe is not located up to a point located beyond the narrowed distal end of the engine exhaust pipe, wherein the ejector chamber comprises a dual pipe structure including:
  an inner pipe section which is defined by the downstream end portion of the engine exhaust pipe and into which the exhaust gas flows from the engine through an upstream end portion of the engine exhaust pipe; and
  an outer pipe section which is defined by a portion of the air discharge pipe having the downstream end portion of the exhaust gas pipe inserted therein and into which the air flows from within the housing through the upstream end portion of the air discharge pipe, wherein the engine exhaust pipe has a constant diameter, other than the distal end thereof, and the first and second straight sections of the air discharge pipe and the straight engine exhaust pipe are parallel to each other, and wherein the downstream end portion of the engine exhaust pipe is inserted into the air discharge pipe through a peripheral wall of the air discharge pipe at the curved section of the air discharge pipe.

* * * * *